US011029830B2

(12) United States Patent
Otsuka et al.

(10) Patent No.: US 11,029,830 B2
(45) Date of Patent: Jun. 8, 2021

(54) DISPLAY CONTROL APPARATUS, DISPLAY CONTROLLING METHOD AND DISPLAY CONTROL PROGRAM FOR PROVIDING GUIDANCE USING A GENERATED IMAGE

(71) Applicant: CASIO COMPUTER CO., LTD., Tokyo (JP)

(72) Inventors: Toshihiko Otsuka, Ome (JP); Takahiro Tomida, Hamura (JP); Natsumi Hamaoka, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/430,495

(22) Filed: Jun. 4, 2019

(65) Prior Publication Data
US 2019/0377481 A1 Dec. 12, 2019

(30) Foreign Application Priority Data
Jun. 11, 2018 (JP) .............................. JP2018-111360

(51) Int. Cl.
*G06K 9/00* (2006.01)
*G06F 3/0484* (2013.01)
(Continued)

(52) U.S. Cl.
CPC ....... *G06F 3/04845* (2013.01); *A45D 44/005* (2013.01); *G06F 1/1681* (2013.01);
(Continued)

(58) Field of Classification Search
CPC .. G16H 20/30; G09B 19/003; G09B 19/0076; G06K 9/00255; G06K 9/00288;
(Continued)

(56) References Cited

U.S. PATENT DOCUMENTS

| 7,054,668 B2 | 5/2006 | Matsumoto et al. |
| 8,953,909 B2* | 2/2015 | Guckenberger ........ G06T 11/00 382/305 |

(Continued)

FOREIGN PATENT DOCUMENTS

JP 2003153739 A 5/2003

OTHER PUBLICATIONS

Tohoku University, Cyberscience Center, Research Division on Advanced Technology, Tohoku University, Progressive Innovation Research Organization, "Succeeded in Development of the Circulation State Monitoring Device [The Mirror Magical]", [online], Sep. 27, 2016 (Heisei 28), searched on Dec. 15, 2017 (Heisei 29), the internet <URL:http://www.tohoku.ac.jp/japanese/newimg/pressimg/tohokuuniv-press20160927_01web.pdf>.

*Primary Examiner* — Alvin H Tan
(74) *Attorney, Agent, or Firm* — Holtz, Holtz & Volek PC

(57) ABSTRACT

A display control apparatus includes a display and a processor, in which the processor performs processing of acquiring an image of an object, displaying an auxiliary substitute image in which auxiliary information is added to a substitute image on the display, switching between i) a first display mode in which the object's image which is acquired is displayed on the display as a first image and the auxiliary substitute image is displayed on the display as a second image and ii) a second display mode in which the object's image which is acquired is displayed on the display as the second image and the auxiliary substitute image is displayed on the display as the first image, and displaying the object's image and the auxiliary substitute image on the display unit in the display mode which is switched.

17 Claims, 10 Drawing Sheets

(51) Int. Cl.
   *G06F 1/16*      (2006.01)
   *G06T 11/60*     (2006.01)
   *A45D 44/00*     (2006.01)

(52) U.S. Cl.
   CPC ..... *G06K 9/00248* (2013.01); *G06K 9/00255*
        (2013.01); *G06K 9/00288* (2013.01); *G06T*
        *11/60* (2013.01); *G06K 9/00221* (2013.01)

(58) Field of Classification Search
   CPC ............ G06K 9/00248; G06K 9/00221; G06F
                                    3/04845; A45D 44/005
   See application file for complete search history.

(56) References Cited

U.S. PATENT DOCUMENTS

| | | | |
|---|---|---|---|
| 9,283,429 B2* | 3/2016 | Aragones | A63B 24/0006 |
| 9,330,239 B2* | 5/2016 | Koduri | G16H 20/30 |
| 9,566,526 B2* | 2/2017 | Doorgeest | A63F 13/87 |
| 9,747,722 B2* | 8/2017 | Adler | G06T 19/003 |
| 9,811,639 B2* | 11/2017 | Aragones | G06F 19/3481 |
| 10,423,824 B2* | 9/2019 | Shen | G06T 7/0014 |
| 2008/0165388 A1* | 7/2008 | Serlet | G11B 27/034 |
| | | | 358/448 |
| 2010/0306685 A1* | 12/2010 | Giaimo, III | A63F 13/67 |
| | | | 715/765 |
| 2012/0223956 A1* | 9/2012 | Saito | G06F 3/0481 |
| | | | 345/582 |
| 2018/0174347 A1* | 6/2018 | Chaney | H04N 9/3179 |
| 2019/0014884 A1* | 1/2019 | Fu | G06K 9/00281 |
| 2019/0066348 A1* | 2/2019 | Jennings | A45D 44/005 |

* cited by examiner

STAND ON ITS OWN BY ROTATIONALLY
MOVING THE LEG AREA AROUND THE HINGE AREA

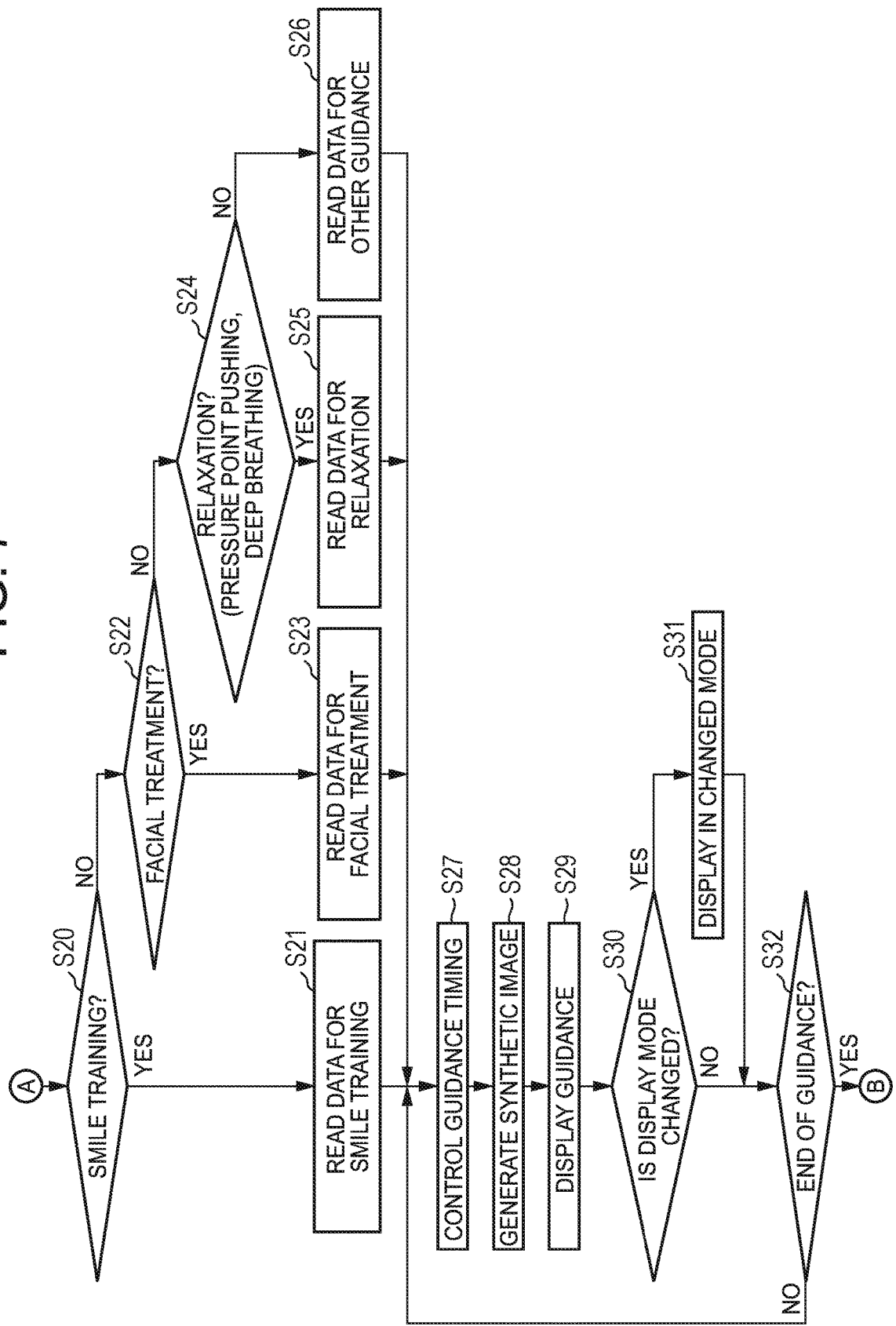

FACE POSITION LINE DISPLAY SCREEN
(INSTRUCT USER TO PERFORM
FACE POSITION ALIGNMENT)

FACE POSITION LINE DISPLAY SCREEN
NOTIFY USER OF OUT-OF-ALIGNMENT)

FACE POSITION LINE DISPLAY SCREEN
(NOTIFY USER OF COMPLETION OF
FACIAL RECOGNITION AND
CALIBRATION)

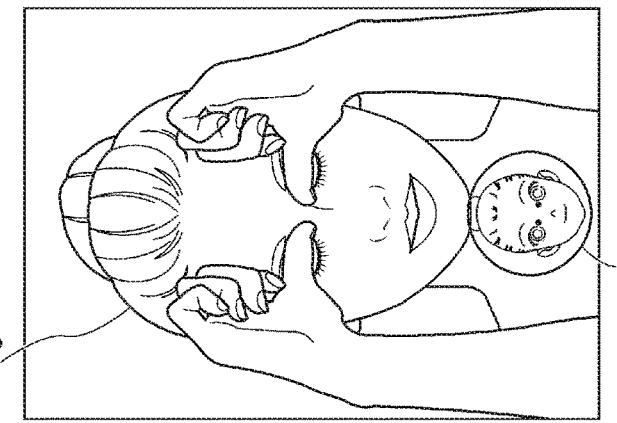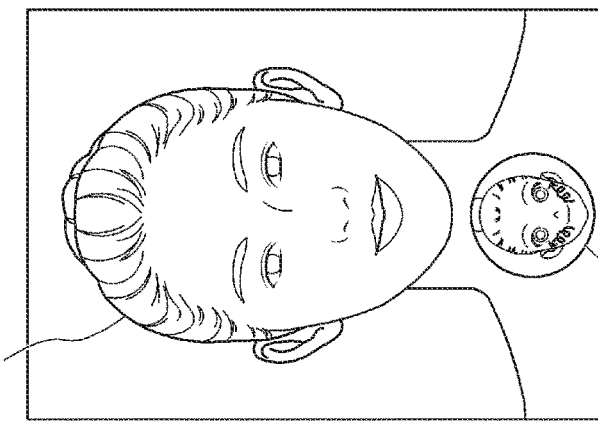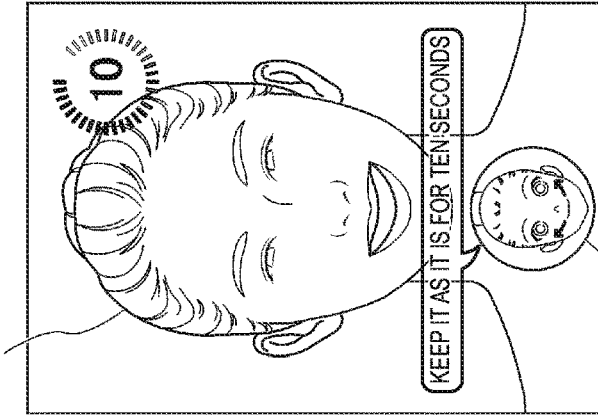

DISPLAY CONTROL APPARATUS, DISPLAY CONTROLLING METHOD AND DISPLAY CONTROL PROGRAM FOR PROVIDING GUIDANCE USING A GENERATED IMAGE

CROSS REFERENCE TO RELATED APPLICATIONS

This application is based upon and claims the benefit of priority under 35 USC 119 of Japanese Patent Application No. 2018-111360 filed on Jun. 11, 2018 the entire disclosure of which, including the description, claims, drawings, and abstract, is incorporated herein by reference in its entirety.

BACKGROUND OF THE INVENTION

1. Field of the Invention

The present invention relates to a display control apparatus, a display controlling method and a display control program.

2. Description of the Related Art

Today, a display control apparatus which displays predetermined information in a state of being superimposed on a user's captured image which is captured by a camera and a user's real image such as a user's mirror image and so forth which is reflected in a mirror is known as disclosed in, for example, Japanese Patent Application Laid Open No. 2003-153739.

BRIEF SUMMARY OF THE INVENTION

According to one aspect of the present invention, there is provided a display control apparatus which includes a display and a processor, in which the processor performs processing of acquiring an image of an object, displaying an auxiliary substitute image in which auxiliary information is added to a substitute image on the display, switching between i) a first display mode in which the object's image which is acquired is displayed on the display as a first image and the auxiliary substitute image is displayed on the display as a second image and ii) a second display mode in which the object's image which is acquired is displayed on the display as the second image and the auxiliary substitute image is displayed on the display as the first image, and displaying the object's image and the auxiliary substitute image on the display in the display mode which is switched.

According to one aspect of the present invention, there is also provided a display controlling method executed by a computer including a display and a processor, the method includes acquiring an image of an object, displaying an auxiliary substitute image in which auxiliary information is added to a substitute image of the object on the display, switching between i) a first display mode in which the object's image which is acquired is displayed on the display as a first image and the auxiliary substitute image is displayed on the display as a second image and ii) a second display mode in which the object's image which is acquired is displayed on the display as the second image and the auxiliary substitute image is displayed on the display as the first image, and displaying the object's image and the auxiliary substitute image on the display in the display mode which is switched.

According to one aspect of the present invention, there is further provided a non-transitory recording medium recording thereon a computer-readable display control program executed by a computer including a display and a processor, the program causing the processor to execute functions of acquiring an image of an object, displaying an auxiliary substitute image in which auxiliary information is added to a substitute image of the object on the display, switching between i) a first display mode in which the object's image which is acquired is displayed on the display as a first image and the auxiliary substitute image is displayed on the display as a second image and ii) a second display mode in which the object's image which is acquired is displayed on the display as the second image and the auxiliary substitute image is displayed on the display as the first image, and displaying the object's image and the auxiliary substitute image on the display in the display mode which is switched.

BRIEF DESCRIPTION OF THE SEVERAL VIEWS OF THE DRAWING

FIG. 7 is a second flowchart describing one example of a flow of the synthetic display processing that the display control apparatus according to one embodiment of the present invention executes.

FIG. 9A through FIG. 9D are schematic diagrams illustrating one example of display in the synthetic display processing that the display control apparatus according to one embodiment of the present invention executes.

DETAILED DESCRIPTION OF THE INVENTION

In the following, one embodiment of the present invention will be described by using the drawings.

Outline of Embodiment

A display control apparatus 1 according to one embodiment of the present invention is configured as a user-portable and self-standing type mirror. Then, the display control apparatus 1 realizes guidance to a user by displaying pieces of auxiliary information used for performing a series of pieces of guidance the contents of which are changed with time or in accordance with user's instructions to the user who visually recognizes an image in the mirror while switching the information to be displayed at a predetermined timing.

In the above-mentioned case, the display control apparatus 1 generates a synthetic image by synthesizing the auxiliary information with a substitute image which would serve as a substitute of a user's real image. That is, the display control apparatus 1 generates an auxiliary substitute image that the auxiliary information is added to the substitute image. In addition, in a case of performing the series of pieces of guidance, the display control apparatus 1 displays this synthetic image and the user's real image respectively on a display screen while making the switch between the synthetic image and the user's real image.

According to the display control apparatus 1 which is configured in this way, an image of the auxiliary information which is an artificial image is synthesized with the substitute image which is also an artificial image and therefore it becomes possible to provide the user with display which is free from a visual gap, is suitable for user's visual recognition and has a sense of unity.

That is, according to the display control apparatus 1, it becomes possible to perform a more appropriate display.

[System Configuration]

Figure 1:
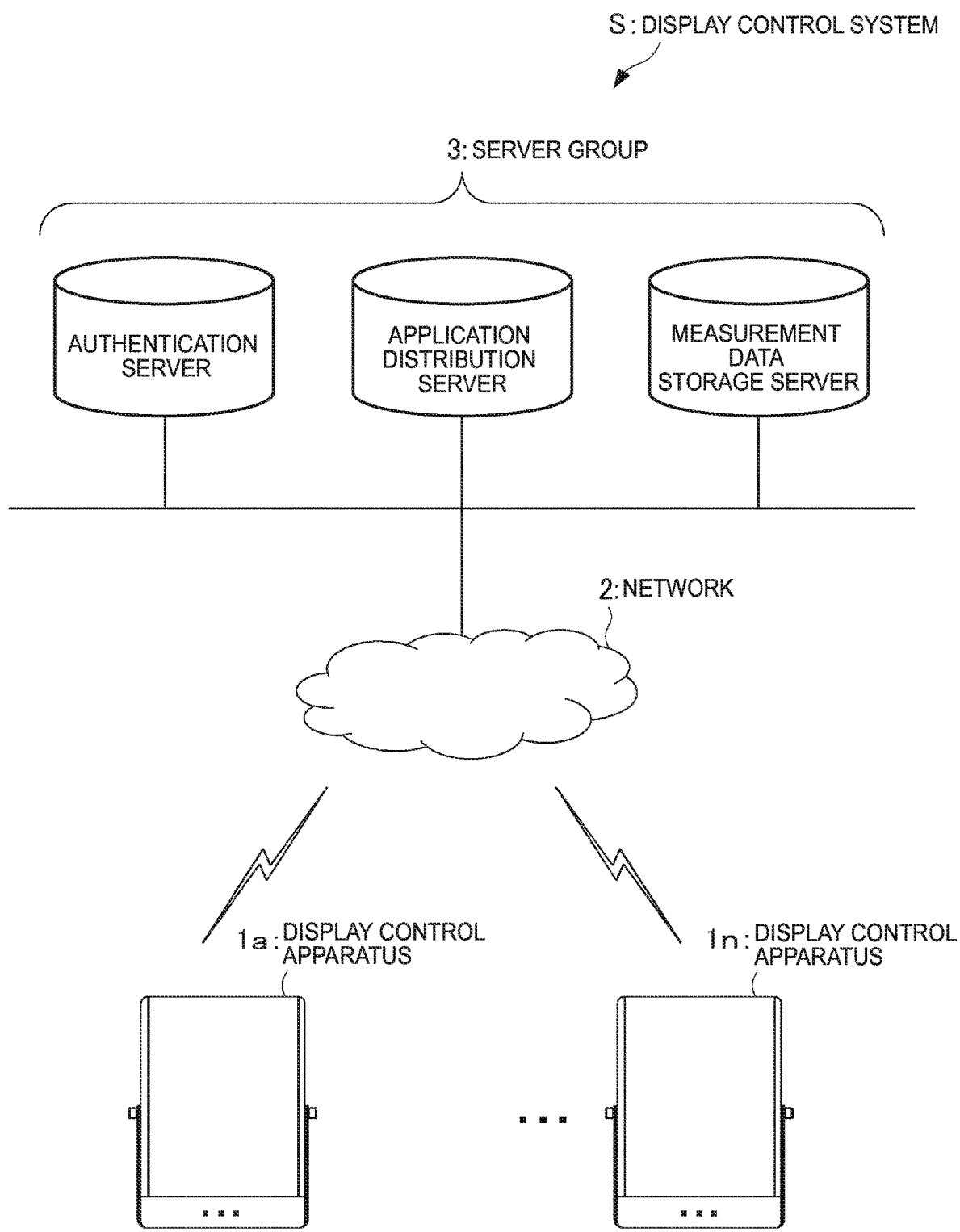
FIG. 1 is a configurational diagram illustrating one example of a configuration of a display control system according to one embodiment of the present invention.

FIG. 1 is a block diagram illustrating one example of an entire configuration of a display control system S in which the display control apparatus 1 according to the present embodiment is included. As illustrated in FIG. 1, the display control system S includes a plurality of the display control apparatuses 1, a network 2 and a server group 3.

There is no particular limitation to the number of the display control apparatuses 1 to be installed and n (n is an optional natural number) display control apparatuses 1 may be included in the display control system S. Incidentally, in the following description, in a case of describing the n display control apparatuses 1 with no particular distinction, the n display control apparatuses 1 will be simply referred to as the "display control apparatus 1" with the alphabets ("a" and "n") which come after the reference numeral "1" being omitted.

As described above, the display control apparatus 1 is an apparatus which performs the guidance by performing the display which is free from the visual gap, is suitable for the user's visual recognition and has the sense of unity with the user. The display control apparatus 1 is connected with each server which is included in the server group 3 over the network 2 to be mutually communicable.

The network 2 is realized by, for example, any one of the Internet, a LAN (Local Area Network) and a cellular phone network, or a network which is configured by mutually combining the above-mentioned networks.

Various servers which cooperate with the display control apparatus 1 are included in the server group 3. For example, an authentication server which is adapted to authenticate the user of the display control apparatus 1 is included in the server group 3. In addition, for example, an application distribution server which distributes application software which is used to realize functions of the display control apparatus 1 is included in the server group 3. Further, for example, a measurement data storage server which stores user-related setting information and user's profile information which is information including a usage history and so forth of the display control apparatus 1 which is used by the user is included in the server group 3.

However, the above-mentioned servers are merely examples and servers having functions other than the above-mentioned functions may be included in the server group 3. In addition, the plurality of servers which is included in the server group 3 may be realized by individual server devices and may be realized by a single server device.

[External Configuration]

Figure 2:
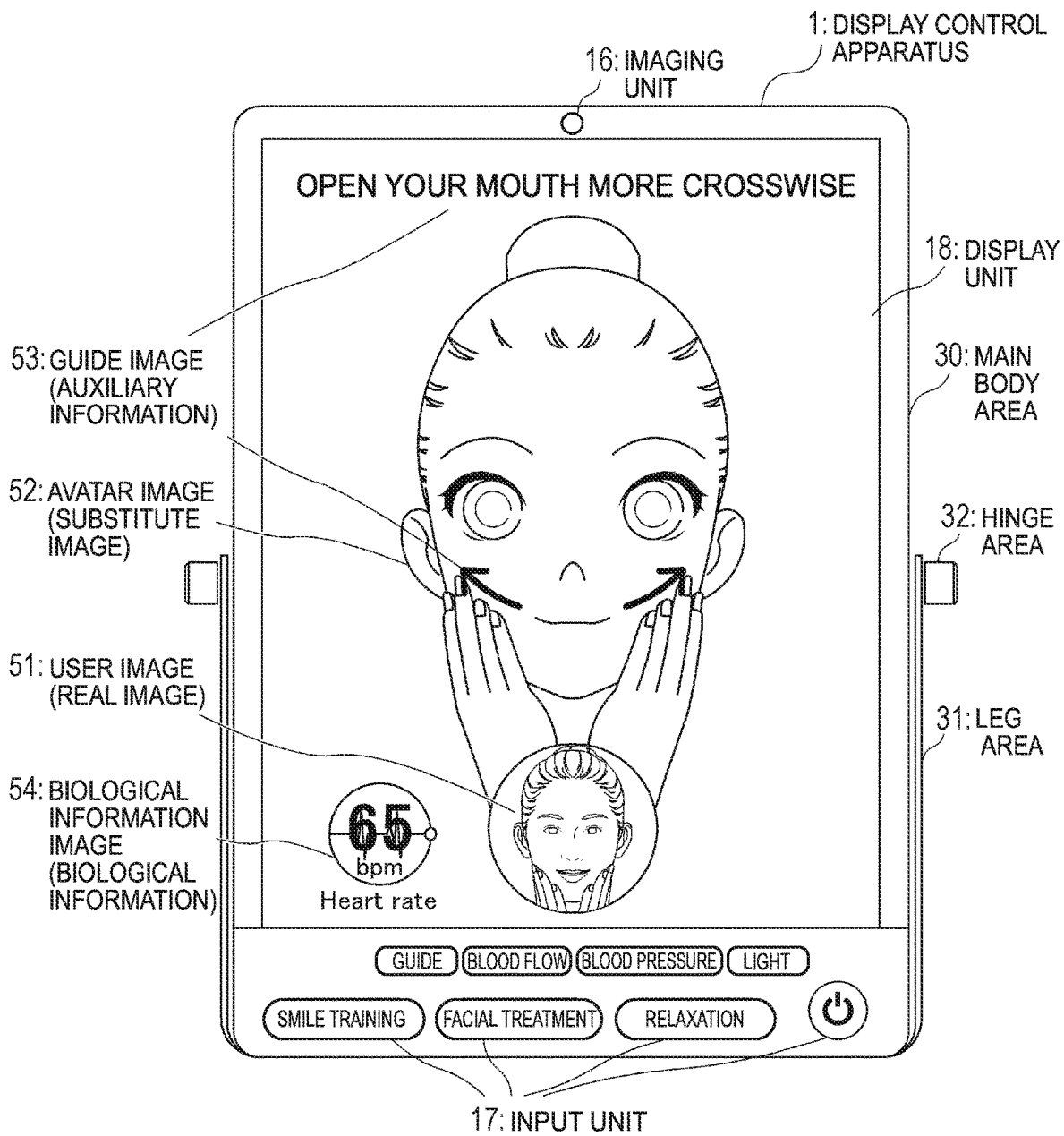
FIG. 2 is a configurational diagram illustrating one example of an external configuration of a front face of a display control apparatus according to one embodiment of the present invention.
Figure 3A:
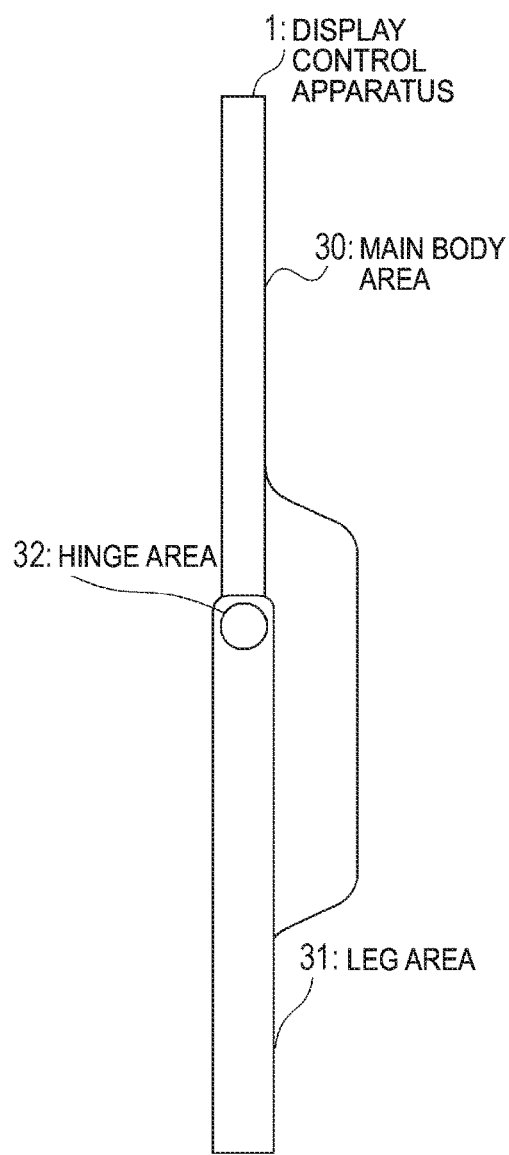
FIG. 3A and FIG. 3B are configurational diagrams illustrating one example of an external configuration of a side face of the display control apparatus according to one embodiment of the present invention.
Figure 3B:
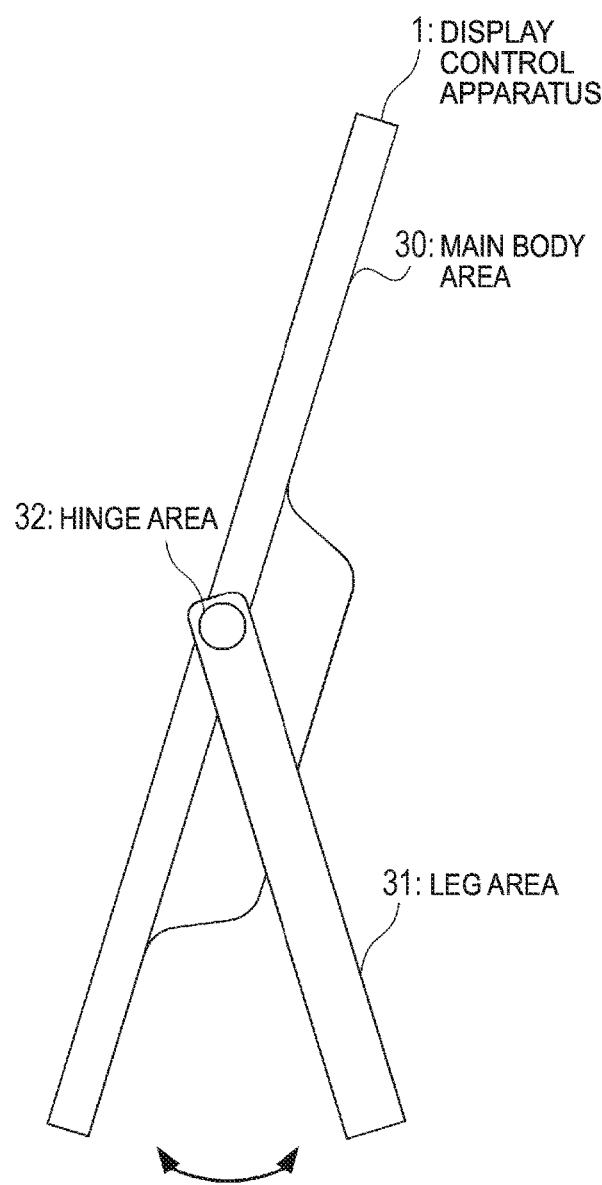

FIG. 2 is a configurational diagram illustrating one example of an external configuration of a front face of the display control apparatus 1 according to one embodiment of the present invention. In addition, FIGS. 3A and 3B are configurational diagrams illustrating examples of an external configuration of a side face of the display control apparatus 1. The front face of the display control apparatus 1 is formed to have, for example, the A4 size which is defined by ISO (International Organization for Standardization) 216 which is one of international standards.

As illustrated in FIG. 2, FIG. 3A and FIG. 3B, the display control apparatus 1 is configured by including a main body area 30, a leg area 31 and a hinge area 32. The main body area 30 is an area which includes a display unit 18 and other hardware units which will be described later with reference to FIG. 4. In addition, the leg area 31 and the hinge area 32 are members which are adapted to make the display control apparatus 1 stand on its own. The leg area 31 is joined with the main body area 30 to be rotationally movable via the hinge area 32.

As illustrated in FIG. 3A, in a case of carrying the display control apparatus 1, the user is able to carry the display control apparatus 1 in an unbulky form by aligning the side face of the main body area 30 with the side face of the leg area 31. On the other hand, as illustrated in FIG. 3B, in a case of utilizing the display control apparatus 1 in a state of being installed on a desk and so forth, the user is able to install the display control apparatus 1 so that the display control apparatus 1 stands on its own by rotationally moving the leg area 31 around the hinge area 32. Incidentally, the hinge area 32 has a mechanism which is adapted to hold the leg area 31 in a state of maintaining a predetermined angle in order to enable the display control apparatus 1 to stand on its own.

The main body area 30 includes the display unit 18 as described above. The display unit 18 is a unit which displays various kinds of information and thereby presents these various kinds of information to the user. The display unit 18 displays, for example, a user image (corresponding to a user image 51 in FIG. 2) which is a user's real image (an object's image which is captured by an imaging unit 16) that the imaging unit 16 captures as a subject, an avatar image (a substitute image) (corresponding to an avatar image 52 in FIG. 2) which is an image of an avatar which would become a substitute of the user, a guide image (corresponding to a guide image 53 in FIG. 2) which is auxiliary information used for performing guidance and a biological information image (corresponding to a biological information image 54 in FIG. 2) which indicates biological information of the user. In addition, in this case, the avatar image 52 and the guide image 53 are mutually synthesized and are displayed on the display unit 18 in a state of being mutually superimposed.

The user is able to grasp these various kinds of information all at once by visually recognizing the display on the display unit 18. Incidentally, the point that such display on the display unit 18 is the one which is free from the visual gap, is suitable for the user's visual recognition and has the sense of unity is just the same as described above.

As illustrated in FIG. 2, the display control apparatus 1 is further equipped with the imaging unit 16, an input unit 17 and the display unit 18 as an external configuration.

The imaging unit 16 is a unit which captures an image of the user who confronts the display unit 18 as the subject when the display control apparatus 1 is utilized. The imaging unit 16 is installed on a position where the imaging unit 16 is able to capture a face image of the user who confronts the display unit 18. The imaging unit 16 is installed on, for example, a front face of the main body area 30 and on an upper part of the display unit 18 as illustrated in FIG. 2.

The input unit 17 is a unit which accepts inputting of a user's operation. The input unit 17 is realized by, for example, a plurality of buttons. The buttons used to make the switch among various modes such as a face slimming treatment (facial treatment) mode, a smile training mode, a biological information recording mode and so forth and the button used for on/off switching of a power source of the display control apparatus 1 are illustrated in FIG. 2 by way of example.

The external configuration of the display control apparatus 1 is described as mentioned above. However, the above-mentioned configuration is merely one example and the external configuration of the display control apparatus 1 is not limited to the above-mentioned example.

For example, the display control apparatus 1 may be further equipped with a light emission unit which emits light for illuminating the user who confronts the display unit 18. The light emission unit illuminates the user by adjusting illuminance and a color component of the light and thereby the display control apparatus 1 functions as a mirror with lighting. The number of the light emission units may be made plural. In addition, the light emission unit may be installed on an upper part or a lower part of the display unit 18 and may be installed on an entire peripheral part of the display unit 18.

In addition, for example, the number and arrangement of the input units 17 may be changed. In addition, for example, a part of the display unit 18 may be configured as a touch panel and the input unit 17 and the display unit 18 may be integrally configured.

[Hardware Configuration]

Figure 4:
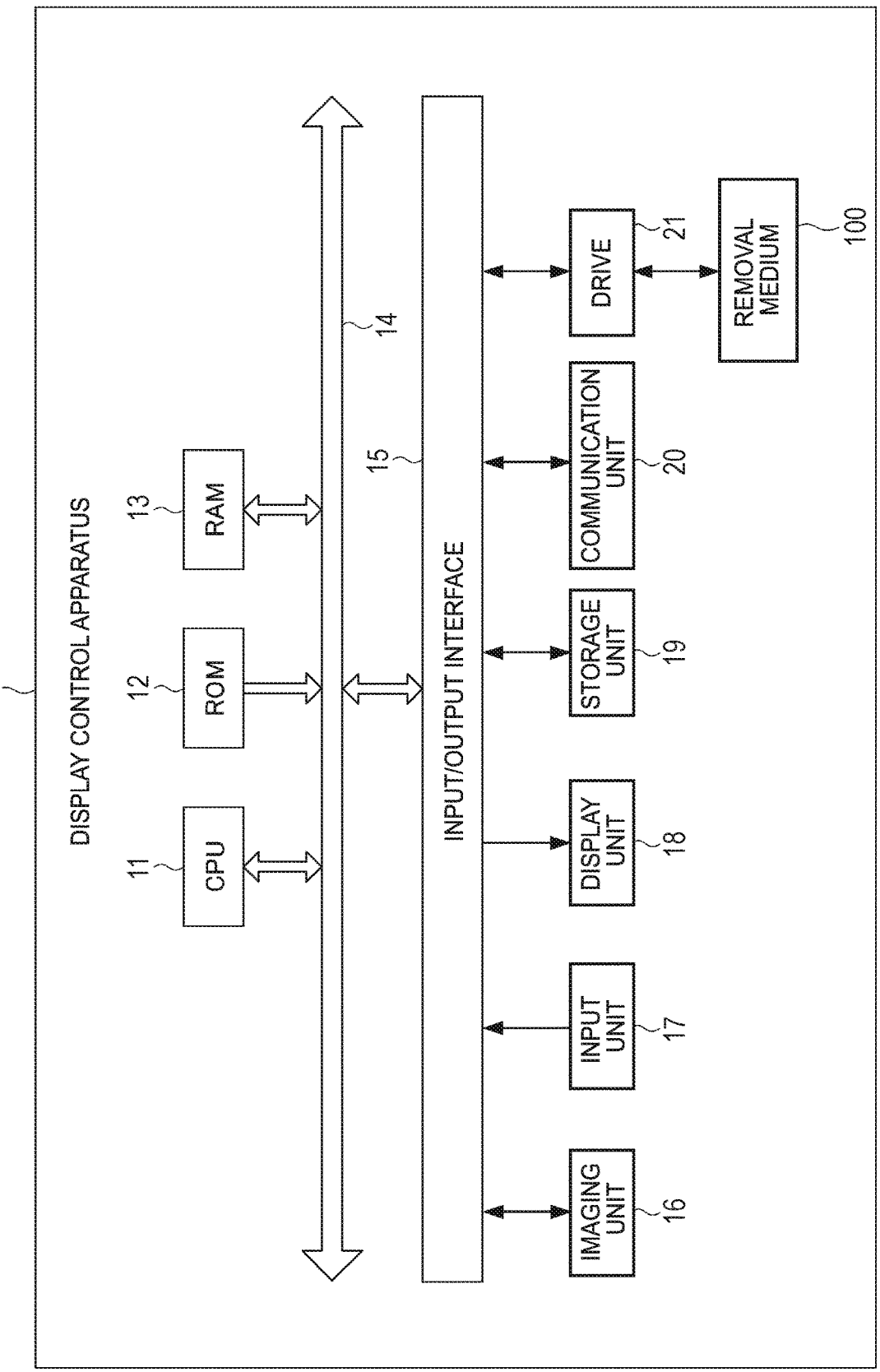
FIG. 4 is a block diagram illustrating one example of a configuration of hardware of the display control apparatus according to one embodiment of the present invention.

FIG. 4 is a block diagram illustrating one example of a configuration of hardware of the display control apparatus 1.

As illustrated in FIG. 4, the display control apparatus 1 is equipped with a CPU (Central Processing Unit) (a processor) 11, a ROM (Read Only Memory) 12, a RAM (Random Access Memory) 13, a bus 14, an input/output interface 15, the imaging unit 16, the input unit 17, the display unit 18, a storage unit 19, a communication unit 20 and a drive 21.

The CPU 11 executes various processes in accordance with a program which is stored in the ROM 12 or a program which is loaded from the storage unit 19 into the RAM 13.

Also, data and so forth which are necessary for the CPU 11 to execute the various processes are appropriately stored in the RAM 13.

The CPU 11, the ROM 12 and the RAM 13 are connected with one another via the bus 14. The input/output interface 15 is also connected to the bus 14. The imaging unit 16, the input unit 17, the display unit 18, the storage unit 19, the communication unit 20 and the drive 21 are connected to the input/output interface 15.

Although not illustrated in FIG. 3, the imaging unit 16 is equipped with an optical lens section and an image sensor. The optical lens section is configured by a light condensing lens such as, for example, a focus lens, a zoom lens and so forth in order to photograph the subject.

The focus lens is a lens which acts to form an image of the subject on a light receiving face of the image sensor.

The zoom lens is a lens which acts to freely change a focal length within a predetermined range.

In addition, a peripheral circuit which adjusts parameters for setting a focal point, exposure, white balance and so forth is provided on the imaging unit 16 as necessary.

The image sensor is configured by a photoelectric conversion element, an AFE (Analog Front End) and so forth.

The photoelectric conversion element is configured by, for example, a CMOS (Complementary Metal Oxide Semiconductor) type photoelectric conversion element and so forth. The subject image enters the photoelectric conversion element through the optical lens section. Then, the photoelectric conversion element photoelectrically converts (captures) the subject image into image signals, accumulates the image signals for a fixed time and sequentially supplies the accumulated image signals to the AFE as analog signals.

The AFE executes various kinds of signal processing such as an A/D (Analog-Digital) conversion process and so forth on the analog image signal. A digital signal is generated by execution of the various signal processing and is output as an output signal from the imaging unit 16.

The output signal like this which is output from the imaging unit 16 is appropriately supplied to the CPU 11 and so forth.

The input unit 17 is configured by the various buttons, a microphone and so forth and inputs various kinds of information in accordance with instructions which are given by a user's operation and with a user's voice.

The display unit 18 is configured by a liquid crystal display and so forth and displays thereon an image which corresponds to image data that the CPU 11 outputs.

The storage unit 19 is configured by a semiconductor memory such as a DRAM (Dynamic Random Access Memory) and so forth and stores various kinds of data therein.

The communication unit 20 performs communication control for making the CPU 11 communicate with other devices (for example, each server which is included in the server group 3) over the network 2.

The drive 21 is configured by an interface to which a removable medium 100 is attachable. The removable medium 100 which is configured by a magnetic disc, an optical disc, a magnetooptical disc, a semiconductor memory and so forth is appropriately attached to the drive 21. A program which is used to execute synthetic display processing which will be described later and various kinds of data such as image data and so forth are stored into the removable medium 100. The program and the various kinds of data such as the image data and so forth which are read out of the removable medium 100 by the drive 21 are installed into the storage unit 19 as necessary.

Incidentally, the display control apparatus 1 may be further equipped with other pieces of hardware in addition to the above-described pieces of hardware. For example, the display control apparatus 1 may be further equipped with an output unit and so forth which are configured by a lamp, a loudspeaker, a vibrating motor and so forth so as to output light, a voice and a vibration signal.

[Functional Configuration]

Figure 5:
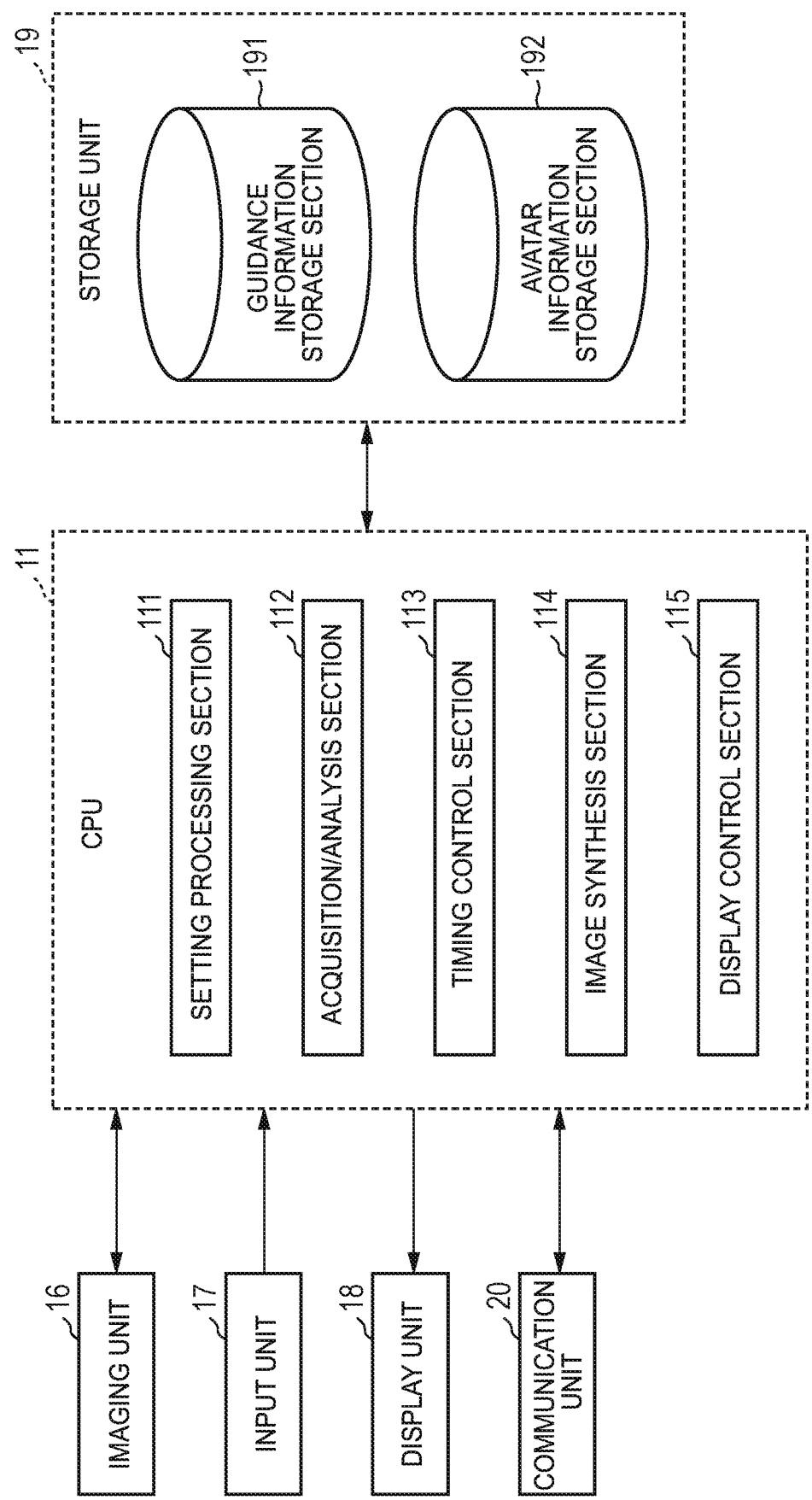
FIG. 5 is a functional block diagram illustrating one example of a functional configuration which is adapted to execute synthetic display processing in functional configurations of the display control apparatus according to one embodiment of the present invention.

FIG. 5 is a functional block diagram illustrating one example of a functional configuration which is adapted to execute the synthetic display processing in the functional configurations of the display control apparatus 1.

The synthetic display processing is a series of processes of displaying, in a case where the display control apparatus 1 generates a synthetic image by synthesizing the substitute image with the auxiliary information, that is, generates the substitute image to which the auxiliary information is added and performs a series of pieces of guidance, the above-described synthetic image and a user's real image respectively on a display screen while making the switch between the synthetic image and the user's real image.

In a case where the synthetic display processing is executed, a setting processing section 111, an acquisition/analysis section 112, a timing control section 113, an image synthesis section 114 and a display control section 115 function in the CPU 11 as illustrated in FIG. 5. That is, the CPU 11 executes processes of the setting processing section 111, the acquisition/analysis section 112, the timing control section 113, the image synthesis section 114 and the display control section 115.

In addition, a guidance information storage section 191 and an avatar information storage section 192 are set in one area of the storage unit 19.

Various kinds of data which relate to the guidance in the synthetic display processing are stored into the guidance information storage section 191. For example, content data such as guide image data, text data, sound data and so forth which are used to generate guidance information which is displayed in execution of the synthetic display processing are stored into the guidance information storage section 191. In addition, the order that the plurality of pieces of guidance information is displayed in the series of pieces of guidance, conditions for switching the guidance information to be displayed from the guidance information which is being currently displayed to the next guidance information, data used for generating various user interfaces and so forth are also stored into the guidance information storage section 191. Further, user's profile information which is generated in relation to the synthetic display processing is stored into the guidance information storage section 191. Incidentally, the guide image may be image data which is generated in advance and may be a CG (computer graphics) image which is generated in real time on the basis of arithmetic operations and so forth. In addition, each piece of data may be stored as each library in units of pieces of guidance so as to be read out with ease when realizing the series of pieces of guidance.

Various kinds of data which relate to the avatar which would serve as the substitute of the user's real image are stored into the avatar information storage section 192. For example, data on the avatar images, conditions used for deciding which avatar image is to be displayed in the guidance and so forth which are used for generation of the avatar image to be displayed in the synthesis display processing are stored into the avatar information storage section 192. In addition, the avatar image may be image data which is generated in advance and may be a CG image which is generated in real time on the basis of arithmetic operations and so forth. The avatar image is an image of a character which mimics a human being and an animal, for example. In addition, the optional number of avatar images may be prepared and the number of the avatar images may be appropriately selected in accordance with a user's attribute (for example, user's gender, age and taste) and contents of the guidance. In addition, the avatar image may be a group of sequentially captured images which is used for realization of an animation display of characters and so forth. In addition, each piece of data may be stored as each library in units of pieces of guidance so as to be read out with ease when realizing the series of pieces of guidance.

Incidentally, the respective pieces of information such as the above-mentioned ones which are stored into the guidance information storage section 191 and the avatar information storage section 192 may be stored only in the storage unit 19. Alternatively, these pieces of information may be also appropriately stored into the removable medium 100 by the drive 21. Further, the respective pieces of information which are stored into the guidance information storage section 191 and the avatar information storage section 192 may be also appropriately stored into a measurement data storage server and so forth which are included in the server group 3.

In addition, in each functional block which will be described in the following, coordinate information is set as premises for execution of the synthetic display processing. For example, information which is used for defining respective coordinate systems such as an imaging coordinate system which is the coordinate system of an image which is captured by the imaging unit 16 and a display unit coordinate system which is the coordinate system of a display surface of the display unit 18 and information which indicates a correspondence relation and which is used for transformation from coordinates in one coordinate system to coordinates in another coordinate system are included in the coordinate information. Each functional block which will be described in the following is able to execute the synthetic display processing by transforming the coordinates in one coordinate system to the coordinates in another coordinate system on the basis of the correspondence relation between/among these respective coordinate systems. The correspondence relation between/among these respective coordinate systems is set by, for example, defining each coordinate system and performing calibration which involves adjustment of an optical axis direction and a zoom factor of the imaging unit 16 when manufacturing the display control apparatus 1.

The setting processing section 111 is a section which controls setting and so forth relating to the synthetic display processing. The setting processing section 111 acquires the application software which is used for execution of the synthetic display processing from, for example, the application distribution server which is included in the server group 3 and makes this application software operate. In addition, the setting processing section 111 authenticates a user who executes the synthetic display processing by communicating with, for example, the authentication server which is included in the server group 3. Further, the setting processing section 111 updates the user's profile information which is used in execution of the synthetic display processing by communicating with, for example, the measurement data storage server which is included in the server group 3.

In addition, the setting processing section 111 displays a menu which is used for performing the guidance on the basis of the application software which is used for execution of the synthetic display processing. The setting processing section 111 displays the menu which includes options for selection of the contents of the guidance such as, for example, "Face Slimming Treatment", "Massage for Smiling (Smile Training)", "Measurement of Biological Information" and "Make-up" are performed. In addition, the setting processing section 111 accepts selection of any one of the guidance contents from the user who refers to the menu via the input unit 17 and so forth. For example, the setting processing section 111 accepts selection of "Face Slimming Treatment". Thereby, the synthetic display processing is executed for the guidance which relates to the face slimming treatment. Incidentally, the face slimming treatment means that the user performs, for example, a lymphatic massage which reduces swelling of the face by making the lymph liquid flow on her/his own face and so forth.

The acquisition/analysis section 112 is a section which acquires an image of the user who becomes the subject of image capturing by the imaging unit 16, analyzes the acquired user's image and acquires user-related information (in the following, referred to as "subject information") on the basis of an analysis result. The subject information is user's biological information and so forth such as, for example, coordinates which indicate a position of each part of the user's face and so forth, and the color of each part of the user's face and so forth.

For acquisition of the subject information, the acquisition/analysis section 112 analyzes the image which includes the user as the subject and that the imaging unit 16 captures, and detects a user's state which is included in the image.

For example, the acquisition/analysis section 112 executes processes which relate to pattern matching of the facial contour and parts and face tracking such as skin color discrimination and so forth on a face image which includes the user's face and thereby recognizes the facial contour, positions of the eyes and the skin region and detects predetermined part regions such as the forehead, the cheeks, the chin, the neck and so forth. Then, the acquisition/analysis section 112 detects states such as the coordinates of the respective part regions so detected, the user's skin color, a user's face angle (that is, a user's face direction), a user's sight line direction and a user's mouth opening degree.

In addition to the above, the acquisition/analysis section 112 may further measure the biological information (also called vital data in some cases) in a state of being out of contact with the user, that is, not actually touching the user. In this case, the above-mentioned detected predetermined regions correspond to regions of interest (ROI) which are used for non-contact acquisition of the biological information.

Then, the acquisition/analysis section 112 performs measurement, for example, by analyzing a component in the vicinity of a heart rate frequency on the basis of a green signal that subcutaneous bloodstream hemoglobin which is present in this region of interest absorbs. The biological information that the acquisition/analysis section 112 measures includes, for example, a pulse, a pulse wave, a blood flow and so forth.

In addition, although the acquisition/analysis section 112 may perform measurement targeting on an image of one region of interest, the acquisition/analysis section 112 may also perform measurement targeting on images of the plurality of regions of interest. In this case, the acquisition/analysis section 112 is able to measure, for example, a pulse wave velocity and a blood pressure change which is correlated to the pulse wave velocity by performing measurement targeting on regions of interest at mutually separated two points (for example, the cheek and the forehead, the forehead/cheek and the palm and so forth) where a pulse delay is found.

In addition, the acquisition/analysis section 112 may also execute an averaging process on the measured biological information by performing denoising and so forth on the measured biological information.

Further, the acquisition/analysis section 112 may calculate and acquire stress levels (for example, an LF (low frequency)/HF (high frequency) index which is based on a heartbeat interval time series (FFI) and a pulse wave amplitude time series (PA), a Lorenz plot index and so forth) by analyzing a video pulse wave and measuring fluctuations in pulse rate, pulse waveform and pulse wave.

Incidentally, measurement of the biological information by the acquisition/analysis section 112 becomes possible by utilizing a technique which is described in, for example, the following literature cited.
<Literature Cited>
Tohoku University, Cyberscience Center, Research Division On Advanced Technology, Tohoku University, Progressive Innovation Research Organization, "Succeeded in Development of the Circulation State Monitoring Device [The Mirror Magical]", [online], Sep. 27, 2016 (Heisei 28), searched on Dec. 15, 2017 (Heisei 29), the Internet <URL: http://www.tohoku.ac.jp/japanese/newimg/pressing/tohokuunivpress20160927_01web.pdf>

The acquisition/analysis section 112 outputs subject information such as the user's face direction, the biological information and so forth which are acquired in this way to the timing control section 113 and so forth which will be described later.

The timing control section 113 is a section which controls a timing (in the following, referred to as a "guidance timing") that the respective images such as the guide image, the avatar image, the synthetic image that these images are mutually synthesized and so forth are displayed and the sound data and so forth are output in the series of pieces of guidance. The timing control section 113 controls the guidance timing on the basis of the information (for example, the above-described order that the plurality of pieces of guidance information is displayed in the series of pieces of guidance and the above-described conditions for switching the guidance information to be displayed from the guidance information which is being currently displayed to the next guidance information) which is stored in the guidance information storage section 191, the information (for example, the above-described condition used for deciding which avatar image is to be displayed in the guidance and so forth) which is stored in the avatar information storage section 192 and other pieces of information (for example, passed time information and the subject information).

For example, when the condition for performing the display is the one which relates to time passage, the timing control section 113 decides that the guidance timing that the display is to be performed has come in a case where the time has passed and outputs such information that the guidance timing has come to the display control section 115 and so forth which will be described later. In addition, for example, when the condition for performing the display is the one which relates to the change of the subject information (for example, the user's face direction shifts to a predetermined direction, a value of the biological information is changed to a predetermined value and so forth), the timing control section 113 decides that the guidance timing that the display is to be performed has come in a case where the subject information is changed and outputs such information that the guidance timing has come to the display control section 115 and so forth which will be described later.

In this case, for example, in a case where the user's face direction shifts to a direction that the user's face turns sideways, the timing control section 113 may decide that the guidance timing that a sideways-turned avatar image (or a synthetic image which includes the sideways-turned image) is to be displayed has come and may output such information that the guidance timing that the sideways-turned avatar image (or the synthetic image which includes the sideways-turned avatar image) is to be displayed has come to the display control section 115 and so forth which will be described later. Thereby, the display control section 115 becomes able to display the avatar image (or the synthetic image which includes the avatar image) such that the avatar image matches the motion of the user's face.

In addition, for example, in a case where values of the blood flow and the pulse of the user reach predetermined values by performing a massage, the timing control section 113 may decide that the guidance timing that the avatar image (or the synthetic image which includes the avatar image) which relates to the next massage is to be displayed has come and may output such information that the guidance timing that the avatar image (or the synthetic image which includes the avatar image) which relates to the next massage is to be displayed has come to the display control section 115 and so forth which will be described later. Thereby, the display control section 115 becomes able to display the avatar image (or the synthetic image which includes the avatar image) which relates to the next massage in a case where the effect of the massage is sufficiently exhibited and the values of the blood flow and the pulse of the user change.

The image synthesis section 114 is a section which synthesizes the guide image (an auxiliary image) which is stored in the guidance information storage section 191 with the avatar image (the substitute image) which is stored in the avatar information storage section 192 and thereby generates an image (in the following, referred to as the "synthetic image") (an auxiliary substitute image) that the guide image is synthesized with the avatar image. That is, the image synthesis section 114 generates the avatar image (the synthetic image, the auxiliary substitute image) to which the guide image (the auxiliary image) is added. The image synthesis section 114 acquires the guide image which is to be displayed in the guidance from the guidance information storage section 191. In addition, the image synthesis section 114 acquires the avatar image which is to be displayed in the guidance from the avatar information storage section 192.

Then, the image synthesis section 114 synthesizes the acquired avatar image with the acquired guide image and thereby generates the synthetic image. It is possible to perform synthesis by, for example, mutually superimposing the avatar image and the guide image or arranging the avatar image and the guide image side by side.

Specifically, the image synthesis section 114 generates the synthetic image in such a manner that, for example, the guide image is superimposed on a predetermined part region such as the face and so forth of the avatar image. For example, in a case of performing the guidance for the massage, the image synthesis section 114 generates the synthetic image in such a manner that the arrow-shape guide image which indicates a hand motion when performing the massage is superimposed on the part region of an object to be massaged.

The image synthesis section 114 outputs the synthetic image which is generated in this way to the display control section 115 and so forth which will be described later.

The display control section 115 is a section which displays the guidance information. The display control section 115 realizes the series of pieces of guidance by making the display unit 18 display the synthetic image and other guidance information while switching the synthetic image and the other guidance information from one to another on the basis of the guidance timing that the above-described timing control section 113 controls.

To achieve the above, the display control section 115 accepts inputting of the synthetic image from the image synthesis section 114. In addition, the display control section 115 reads the guidance information out of the guidance information storage section 191.

Then, the display control section 115 displays the synthetic image, the user image and other images on a position which is defined in the read guidance information on the basis of the guidance timing that the timing control section 113 controls and in the order which is defined in the read guidance information while switching the image to be displayed. That is, the display control section 115 displays the synthetic image so as to change the auxiliary information and changes and displays other guidance information on the basis of the guidance timing.

The user is able to visually recognize the part region to be massaged, a direction in which the massage is performed and so forth comprehensively by referring to the synthetic image that the display control section 115 displays. Here, the synthetic image is the one that the guide image which is the artificial image is synthesized with the avatar image which is also the artificial image. That is, in the present embodiment, it is possible to provide the user with the display which is free from the visual gap, is suitable for user's visual recognition and has the sense of unity.

Further, in this case, the display control section 115 is able to further display the user image which is the real image of the user herself/himself. Thereby, the user becomes able to perform predetermined treatment (for example, the massage and so forth) more comprehensibly while comparing the real image with the synthetic image.

In addition, the display control section 115 may automatically arrange and display a direction that the user is to be turned in the series of pieces of guidance and a massaging method in an area where the above-described information does not overlap the user image which is the real image of the user's face and so forth (that is, the area where the above-described information does not superimpose on the user's face) in the form of an image and a text. In addition to the above, the display control section 115 may also automatically arrange and display waveform data, necessary letters/characters and image information which are used to display the biological information in, for example, an area where the above-described information does not overlap the user image which is the real image of the user's face and so forth (that is, the area where the above-mentioned information does not superimpose on the user's face).

In a case of performing display of the information together with the user image and the display that the information does not superimpose on the user image such as those described above, for example, the acquisition/analysis section 112 detects a predetermined part region of the user that the imaging unit 16 captures by the face tracking. Then, the acquisition/analysis section 112 acquires the coordinates of the display unit coordinate system which correspond to the coordinates of the imaging coordinate system of the detected part region on the basis of the correspondence relation between/among the above-described respective coordinate systems. Then, the display control section 115 becomes able to perform the display by displaying a predetermined image on the coordinates of the display unit coordinate system of the display unit 18 that the acquisition/analysis section 112 acquires.

In addition, the display control section 115 may combine these different kinds of display with one another. For example, the display control section 115 may display the predetermined image in the area where the predetermined image overlaps the user image which is the real image of the user's face and so forth in a superimposed state and may display the text which indicates the contents of the massage in an area where the text does not overlap the user image which is the real image of the use's face and so forth.

The display control section 115 displays the above-mentioned pieces of information in real time and thereby it becomes possible to appropriately perform the series of pieces of guidance so that it is comprehensibly transmitted to the user.

Incidentally, the display control section 115 may output the guidance information by another method in addition to the display of the information. For example, the display control section 115 may read out the guidance information which includes the sound data and may output voices and music which are generated from the read-out guidance information through the loudspeaker. In addition to the above, for example, the display control section 115 may change a light emitting state by a light emission section.

[Synthetic Display Processing]

Figure 6:
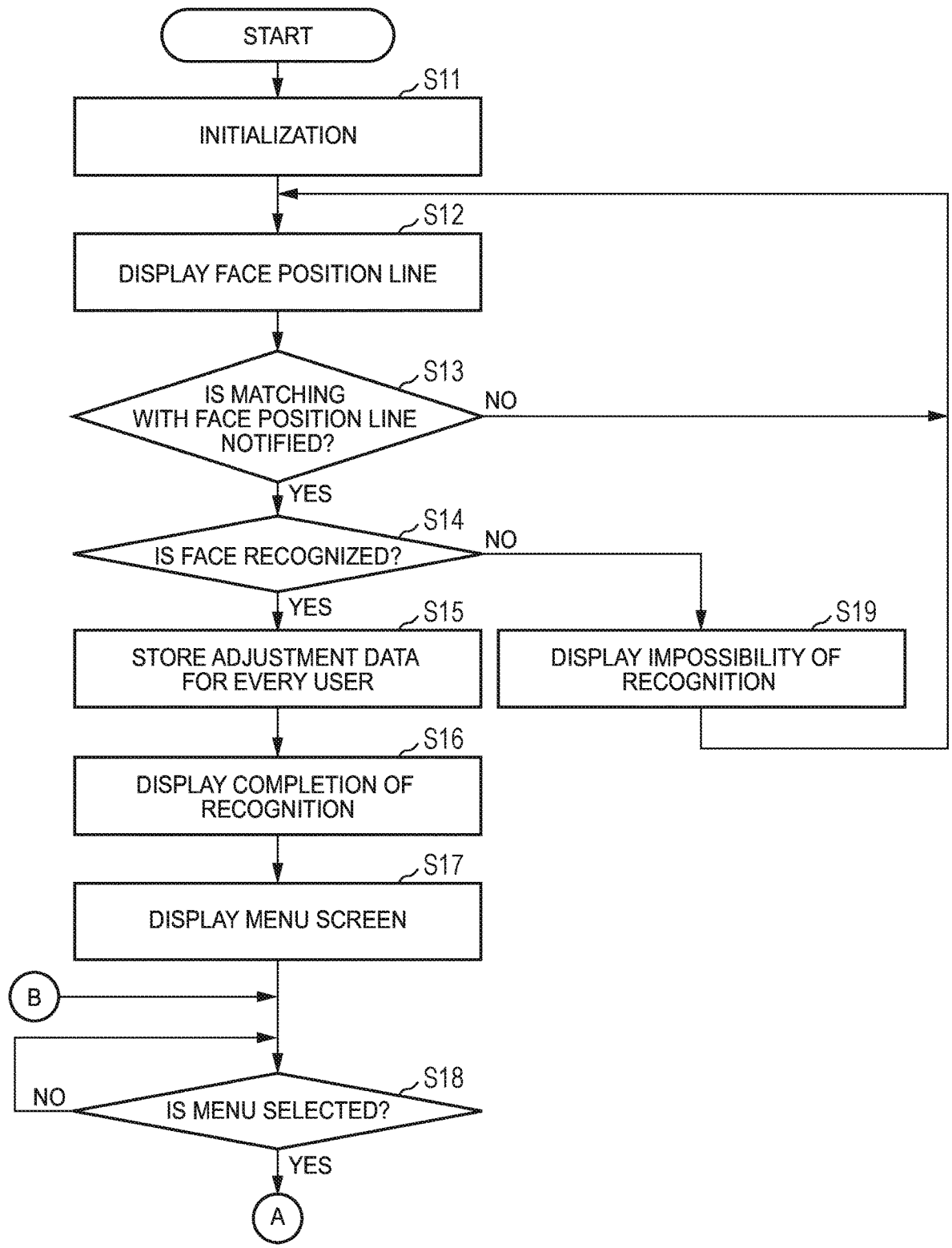
FIG. 6 is a first flowchart describing one example of a flow of the synthetic display processing that the display control apparatus according to one embodiment of the present invention executes.

FIG. 6 and FIG. 7 are flowcharts illustrating examples of a flow of the synthetic display processing that the display control apparatus 1 which has the functional configuration in FIG. 5 and is illustrated in FIG. 1 executes.

Execution of the synthetic display processing is started simultaneously with, for example, power-on of the display control apparatus 1.

As illustrated in FIG. 6, in step S11, the setting processing section 111 performs initialization. For example, the setting processing section 111 acquires the application software which is used to execute the synthetic display processing from the application distribution server which is included in the server group 3 and makes the application software operate. In addition, the setting processing section 111 performs setting which conforms to the application software on respective pieces of hardware such as the imaging unit 16 and so forth in association with the operation of the application software. Then, the setting processing section 111 makes the imaging unit 16 start image-capturing.

Figure 8A:
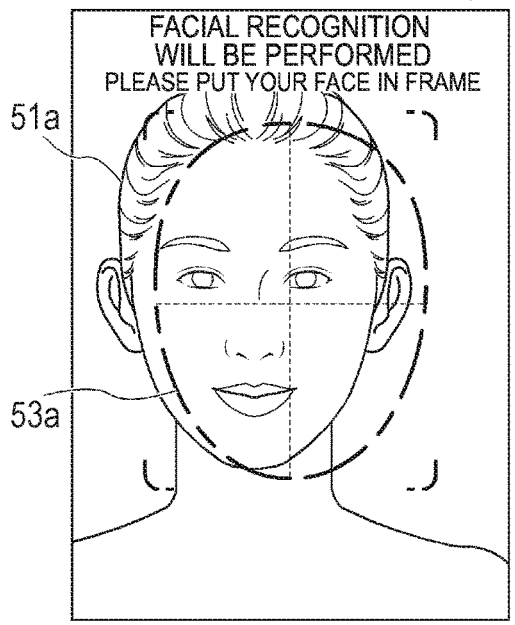
FIG. 8A through FIG. 8C are schematic diagrams illustrating one example of display in the synthetic display processing that the display control apparatus according to one embodiment of the present invention executes.
Figure 8B:
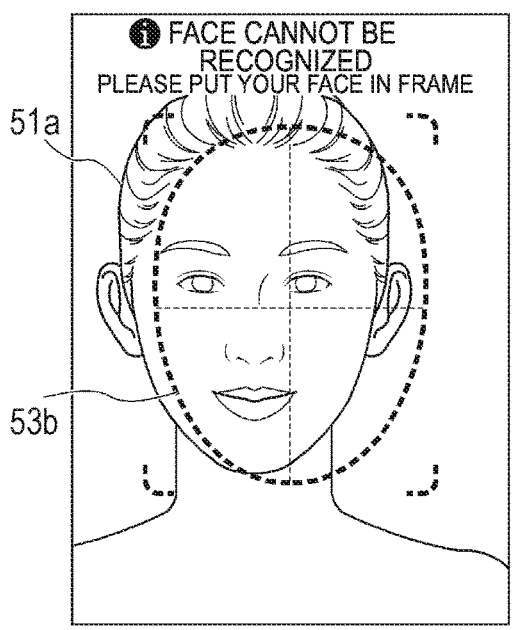

In step S12, the display control section 115 displays the face position line as the guide image for alignment of the user's face position. Examples of the display screens of the face position line are illustrated in FIG. 8A and FIG. 8B. The face position line is displayed as illustrated as a guide image 53a in FIG. 8A. In addition, also a user image 51a is displayed. The user moves her/his face in such a manner that the position of her/his own face matches the center of the guide image 53a within the contour of the guide image 53a.

In step S13, the acquisition/analysis section 112 decides whether a notice that the face position line matches the user's face is received from the user. This notice from the user is performed by the user who decides that the face position line matches her/his face by, for example, depressing a predetermined button which is included in the input unit 17. In a case where no notice is received from the user, "No" is decided in step S13 and the process returns to step S12 and execution of the process is repeated once again. On the other hand, in a case where the notice is received from the user, "Yes" is decided in step S13 and the process proceeds to step S14.

In step S14, the acquisition/analysis section 112 attempts facial recognition and decides whether the facial recognition is successfully attained. In a case where the facial recognition is successfully attained, "Yes" is decided in step S14 and the process proceeds to step S15. On the other hand, in a case of failing in attainment of the facial recognition, "No" is decided in step S14 and the process proceeds to step S19.

In step S19, the display control section 115 displays a message that recognition of the user's face is impossible as illustrated in FIG. 8B by way of example. Then, the process returns to step S12. In this case, it is preferable to display the text and so forth of such a content that "Please put your face in a frame" and so forth so as to persuade the user to move her/his face such that the next facial recognition is successfully attained.

In step S15, the setting processing section 111 adjusts (that is, calibrates) the size and the position of the face when displaying the user's face on the display unit 18 in accordance with the size of the face in the user's image that the imaging unit 16 captures. Then, the setting processing section 111 stores adjustment data which indicates a result of adjustment into the storage unit 19. Later display of the user's images by the display control section 115 is performed on the basis of the above-mentioned adjustment data.

Figure 8C:
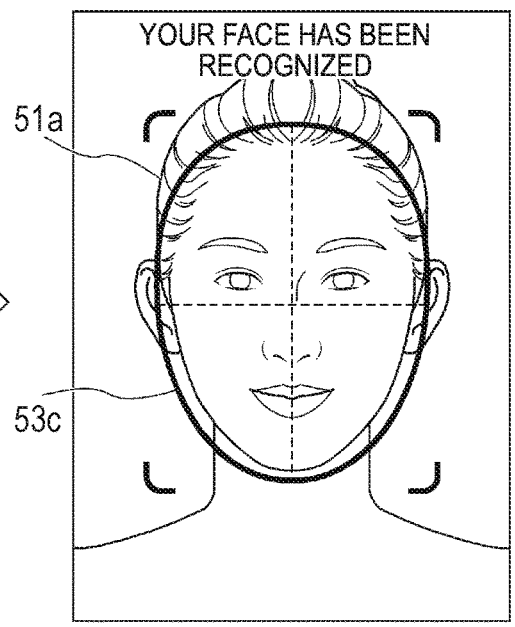

In step S16, the display control section 115 displays a message that the user's face recognition is completed as illustrated in FIG. 8C by way of example. Incidentally, in each of the guide image 53a, a guide image 53b and a guide image 53c, a display status (for example, the color) of the face position line may be made different from others in such a manner that the current situation is transmitted to the user.

In step S17, the display control section 115 displays the menu screen from which the user selects any one of guidance menus. Incidentally, in the following, although description will be made on the assumption that the number of the guidance menus is four, this number is merely illustrative for description and the number of the guidance menus is not particularly limited.

In step S18, the setting processing section 111 decides whether selection of any one of the guidance menus is accepted from the user. In a case of accepting the selection, "Yes" is decided in step S18 and the process proceeds to step S20. On the other hand, in a case of not accepting the selection, "No" is decided in step S18 and the decision in step S18 is repetitively made in a predetermined cycle.

In step S20, it is decided whether the guidance menu which is selected in step S19 is "Smile Training". In a case where the menu is "Smile Training", "Yes" is decided in step S20 and the process proceeds to step S21. In a case where the menu is not "Smile Training", "No" is decided in step S20 and the process proceeds to step S22.

In step S21, each of the timing control section 113, the image synthesis section 114 and the display control section 115 reads data which is necessary to conduct the series of pieces of guidance for "Smile Training" out of the guidance information storage section 191 and the avatar information storage section 192.

In step S22, it is decided whether the guidance menu which is selected in step S19 is "Facial Treatment". In a case where the menu is "Facial Treatment", "Yes" is decided in step S22 and the process proceeds to step S23. In a case where the menu is not "Facial Treatment", "No" is decided in step S22 and the process proceeds to step S24.

In step S23, each of the timing control section 113, the image synthesis section 114 and the display control section 115 reads data which is necessary to conduct the series of pieces of guidance for "Facial Treatment" out of the guidance information storage section 191 and the avatar information storage section 192.

In step S24, it is decided whether the guidance menu which is selected in step S19 is "Relaxation (Pressure Point Pushing and Deep Breathing)". In a case where the menu is "Relaxation", "Yes" is decided in step S24 and the process proceeds to step S25. In a case where the menu is not "Relaxation", "No" is decided in step S24 and the process proceeds to step S26.

In step S25, each of the timing control section 113, the image synthesis section 114 and the display control section 115 reads data which is necessary to conduct the series of pieces of guidance for "Relaxation" out of the guidance information storage section 191 and the avatar information storage section 192.

In step S26, each of the timing control section 113, the image synthesis section 114 and the display control section 115 reads data which is necessary to conduct the series of pieces of guidance for the menu (for example, "Make-Up") other than "Smile Training", "Facial Treatment" and "Relaxation" out of the guidance information storage section 191 and the avatar information storage section 192.

In step S27, the timing control section 113 controls the guidance timing on the basis of the data which is read in any one of above-described step S21, step S23, step S25 and step S26, the subject information which is input from the acquisition/analysis section 112 and so forth.

In step S28, the image synthesis section 114 generates the synthetic image on the basis of the data which is read in any one of the above-described step S21, step S23, step S25 and step S26.

In step S29, the display control section 115 performs guidance display for realizing the series of pieces of guidance on the basis of the guidance timing which is controlled by the timing control section 113, the data which is read in any one of the above-described step S21, step S23, step S25 and step S26 and the synthetic image that the image synthesis section 114 generates. One example of the guidance display is illustrated in FIG. 9.

For example, in a case where "Smile Training" is selected in step S20, the display control section 115 performs guidance display such as that which is illustrated in FIG. 9A. Specifically, the display control section 115 displays a synthetic image that a smiling avatar image and a guide image used for making a smiling face are mutually superimposed as illustrated as an avatar image 52d and a guide image 53d on a lower part of the display unit 18. The user performs training for making the smiling face while referring to the synthetic image as illustrated as a user image 51d. In addition, in this case, a text for encouraging the user to keep on smiling such as, for example, "Keep As It Is For Ten Seconds!" and so forth and an icon which is used for counting down ten seconds may be displayed as one of the guide images.

In addition to the above, for example, in a case where "Facial Treatment" is selected in step S22, the display control section 115 performs guidance display such as that which is illustrated in FIG. 9B. Specifically, the display control section 115 displays a synthetic image that an avatar image and a guide image which indicates motions of hands in a massage in "Facial Treatment" are mutually superimposed as illustrated as an avatar image 52e and a guide image 53e on the lower part of the display unit 18. The user performs the massage in "Facial Treatment" while referring to the above-described synthetic image.

In addition to the above, for example, in a case where "Relaxation" is selected in step S24, the display control section 115 performs guidance display such as that which is illustrated in FIG. 9C at a first guidance timing. Specifically, the display control section 115 displays a synthetic image that an avatar image and a guide image which indicates a position of a first pressure point to be pushed are mutually superimposed as illustrated as an avatar image 52f and a guide image 53f on the lower part of the display unit 18. The user performs pressure-point-pushing on the first pressure point while referring to the above-described synthetic image. In addition, the display control section 115 performs guidance display such as that which is illustrated in FIG. 9D and which is performed again in a case where "No" is decided in step S32 which will be described later at a second guidance timing. Specifically, the display control section 115 displays a synthetic image that an avatar image and a guide image which indicates a position of a second pressure point to be pushed are mutually superimposed as illustrated as an avatar image 52g and a guide image 53g on the lower part of the display unit 18. The user who pushes the first pressure point as illustrated as a user image 51g pushes the second pressure point while refereeing to the above-mentioned synthetic image. In the present embodiment, it is possible to display the images to be displayed in the series of pieces of guidance by appropriately making the switch in accordance with the guidance timing in this way.

In step S30, the display control section 115 decides whether the display mode is to be changed. Display mode changing may be performed in accordance with the user's operation and may be performed in accordance with any one of the guidance timings in the series of pieces of guidance. In a case of changing the display mode, "Yes" is decided in step S30 and the process proceeds to step S31. On the other hand, in a case of not changing the display mode, "No" is decided in step S31 and the process proceeds to step S32.

Figure 10A:
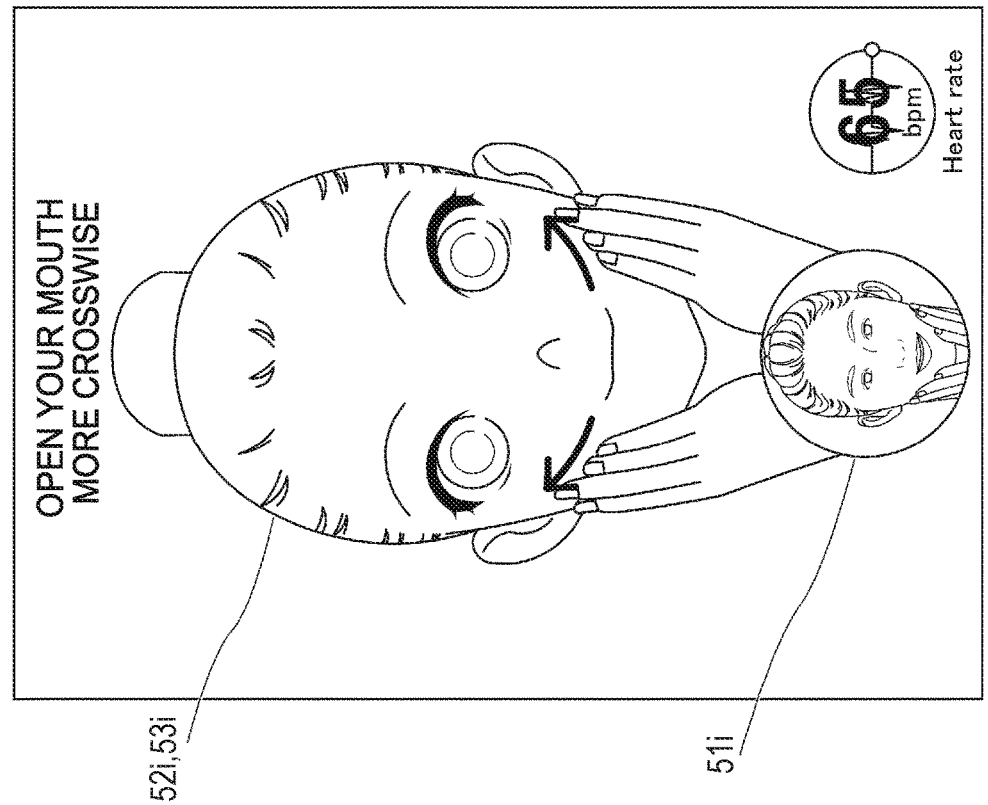
FIG. 10A and FIG. 10B are schematic diagrams illustrating one example of display in the synthetic display processing that the display control apparatus according to one embodiment of the present invention executes.
Figure 10B:
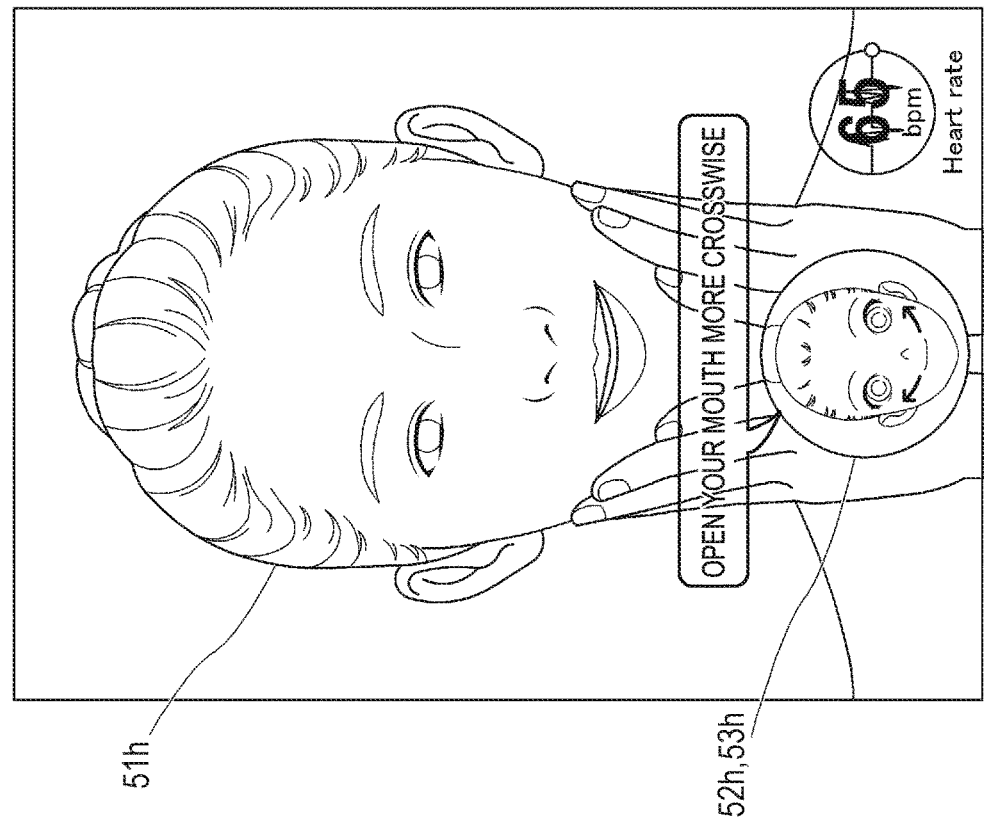

In step S31, the display control section 115 performs display which corresponds to the display mode which is obtained after changed. Examples of display switching which is performed in association with the above-described display mode changing are illustrated in FIG. 10A and FIG. 10B. In the present embodiment, for example, a first display mode in which the user image is displayed as a main image (a first image) and the synthetic image that the avatar image and the guide image are mutually synthesized is displayed as a sub image (a second image) and a second display mode in which the user image is displayed as the sub image and the synthetic image that the avatar image and the guide image are mutually synthesized is displayed as the main image are prepared. That is, the display control section 115 also functions as a switch section which makes the switch between the first display mode in which the user image is displayed as the main image and the synthetic image that the avatar image and the guide image are mutually synthesized is displayed as the sub image and the second display mode in which the user image is displayed as the sub image and the synthetic image that the avatar image and the guide image are mutually synthesized is displayed as the main image.

In a case of performing display in the first display mode, for example, as illustrated in FIG. 10A, a user image 51h is displayed on the screen center in a large size as the main image (a first display status) and an avatar image 52h and a guide image 53h which are mutually synthesized as a synthetic image are displayed on a lower part and so forth of the screen in a size which is smaller than the size of the main image as the sub image (a second display status).

On the other hand, in a case of performing display in the second display mode, for example, as illustrated in FIG. 10B, an avatar image 52i and a guide image 53i which are mutually synthesized as a synthetic image are displayed on the screen center as the main image in a large size (the first display status) and a user image 51i is displayed on the lower part and so forth of the screen as the sub image in a size which is smaller than that of the main image (the second display status).

It becomes possible to perform various kinds of display which meet the contents of the series of pieces of guidance and a user's demand by providing the plurality of display modes and switching the display mode in accordance with the guidance timing and the user's operation.

In step S32, the timing control section 113 decides whether the series of pieces of guidance is terminated on the basis of the guidance timing. In a case of not yet terminating the series of pieces of guidance, "No" is decided in step S32 and the process returns to step S27 and execution of the processes is repeated once again. In the process which is executed once again, for example, the point that the display is performed by switching from the display in FIG. 9C to the display in FIG. 9D is as described above.

On the other hand, in a case of terminating the series of pieces of guidance, "Yes" is decided in step S32 and the process returns to step S18. Then, in a case where a new guidance menu is selected, execution of the processes in the above-described step S19 and succeeding steps is repeated once again.

Incidentally, in the synthetic display processing which will be executed in the next and succeeding times, execution of the processes such as acquisition of the application software and so forth in step S11 may be omitted.

According to the above-described synthetic display processing, it is possible to display the images to be displayed in the series of pieces of guidance by appropriately making the switch in accordance with the guidance timing. For example, it is possible to display the synthetic images by appropriately switching from one synthetic image to another synthetic image. Here, the synthetic image is the image that the guide image which is the artificial image is synthesized with the avatar image which is also the artificial image. That is, according to the above-described synthetic display processing, it is possible to provide the user with the display which is free from the visual gap, is suitable for the user's visual recognition and has the sense of unity.

In addition, according to the above-described synthetic display processing, it is also possible to further display the user image which is the real image of the user herself/himself. Thereby, the user becomes able to perform the massage and so forth more comprehensively while comparing the real image with the synthetic image.

Further, according to the above-described synthetic display processing, it becomes possible to perform various kinds of display which follows the contents of the series of pieces of guidance and the user's demand by preparing the plurality of display modes and switching the display mode to be used in accordance with the guidance timing and the user's operation.

For example, it is possible to perform such display that, in a case of a guidance menu in which the user is inexperienced, the synthetic image which indicates the way of performing the massage and so forth is mainly displayed and then when the user becomes experienced in the guidance menu, the user image which indicates the user's state is mainly displayed. In a case of performing the display in this way, for example, the timing control section 113 manages the proficiency level of the user. Specifically, the timing control section 113 makes the storage unit 19 store a value of the proficiency level of the user. Then, the timing control section 113 increments the value of the proficiency level of the user every time the number of times of the execution of the guidance menu of the user is increased. Alternatively, the timing control section 113 increments the value of the proficiency level of the user on the basis of other standards such as an integrated value of the time for which the display control apparatus 1 is used by the user and so forth.

Then, in a case where the user is inexperienced in the guidance menu and the value of the proficiency level is less than a predetermined threshold value which is set in advance, the display control section 115 mainly displays the synthetic image which indicates the way of performing the massage and so forth. On the other hand, in a case where the user becomes experienced in the guidance menu and the value of the proficiency level becomes not less than the predetermined threshold value which is set in advance, the display control section 115 mainly displays the user image which indicates the user's state. Incidentally, although the proficiency level may be managed for every guidance menu, the proficiency level may be managed as common proficiency level with no distinction of the respective guide menus. In addition, the value of the proficiency level may be corrected in accordance with the user's operation.

The display control apparatus 1 which is configured as described above is equipped with the display unit 18, the acquisition/analysis section 112, the avatar information storage section 192, the image synthesis section 114 and the display control section 115.

The acquisition/analysis section 112 acquires the real image of the object.

The avatar information storage section 192 stores the substitute image of the object therein.

The image synthesis section 114 synthesizes the auxiliary information with the substitute image that the avatar information storage section 192 stores therein and thereby generates the synthetic image.

The display control section 115 displays the object's real image which is acquired by the acquisition/analysis section 112 and the synthetic image which is generated by the image synthesis section 114 while switching the image to be displayed on the basis of the predetermined timing which is controlled by the timing control section 113.

Since the image of the auxiliary information which is the artificial image is synthesized with the substitute image which is also the artificial image in this way, it becomes possible to provide the user with the display which is free from the visual gap, is suitable for user's visual recognition and has the sense of unity. In addition, it is possible to display the synthetic image such as the above and the real image (for example, the user's captured image which is captured by the camera, the user's mirror image which is reflected in the mirror and so forth) while switching the image to be displayed.

The display control apparatus 1 is further equipped with the imaging unit 16 which captures the object's image and the acquisition/analysis section 112 acquires the object's real image which is captured by the imaging unit 16 as the object's real image.

Thereby, it becomes possible to display the user's real image which is actually captured. In addition, it is possible to display the image in real time when captured.

The display control apparatus 1 is further equipped with the timing control section 113.

The timing control section 113 controls the predetermined timing that the auxiliary information is displayed on the display unit 18.

The display control section 115 displays the object's real image which is acquired by the acquisition/analysis section 112 and the synthetic image which is generated by the image synthesis section 114 on the basis of the predetermined timing which is controlled by the timing control section 113 while switching the image to be displayed on the display unit 18.

Thereby, it becomes possible to display the synthetic image and the object's real image while switching the image to be displayed.

In a case where the object in the object's real image which is acquired by the acquisition/analysis section 112 enters a predetermined state, the timing control section 113 controls the predetermined timing.

Thereby, it becomes possible to switch the auxiliary information and the synthetic image to be displayed on condition that, for example, the user turns sideways, the user performs predetermined treatment for a predetermined time period and others.

In a case where the object in the object's real image which is acquired by the acquisition/analysis section 112 enters the predetermined state, the image synthesis section 114 selects the substitute image which is used for generation of the synthetic image.

Thereby, for example, in a case where the user turns sideways, it becomes possible to display the synthetic image which includes the avatar image which turns sideways in the same way. Thereby, it becomes possible to make the user feel the sense of unity with the avatar image.

The predetermined state includes a state which relates to the predetermined treatment that the object concerned performs on her/him own.

Thereby, it becomes possible to control the predetermined timing and to select the substitute image which is used in the synthetic image on the basis of each of the states which relate to, for example, the massage, the pressure point pushing and so forth which are included in the predetermined treatment.

The predetermined state also includes a state which relates to the biological information of the object concerned.

Thereby, it becomes possible to control the predetermined timing and to select the substitute image which is used in the synthetic image on the basis of a change of the biological information.

The timing control section 113 controls the predetermined timing and makes the display unit 18 display the plurality of synthetic images while switching the image to be displayed, and thereby performs the series of pieces of guidance.

Thereby, it becomes possible to realize sequential guidance which uses the plurality of synthetic images.

The timing control section 113 controls the predetermined timing on the basis of the plurality of pieces of auxiliary information which are used to perform the series of pieces of guidance.

Thereby, it becomes possible to display the plurality of pieces of auxiliary information (or the synthetic images which include these pieces of auxiliary information respectively) at a timing that each piece of the plurality of pieces of auxiliary information is to be displayed.

The display control section 115 replaces the display statuses of the object's real image which is acquired by the acquisition/analysis section 112 and the synthetic image which is generated by the image synthesis section 114 on the display unit 18 with each other on the basis of the predetermined condition.

Thereby, it becomes possible to replace the display statuses of the object's real image and the synthetic image with each other, for example, in such a manner that one of the images is displayed as the main image and the other of the images is displayed as the sub image in one display status and the other of the images is displayed as the main image and one of the images is displayed as the sub image in the other display status.

The predetermined condition is the condition which relates to the predetermined timing.

To replace the display statuses with each other means to replace with each other the display sizes and/or the display positions of the object's real image which is acquired by the acquisition/analysis section 112 and the synthetic image which is generated by the image synthesis section 114 when displaying on the display unit 18.

Thereby, it becomes possible to realize replacement of the display sizes and/or the display positions of the images according to the predetermined timing.

The timing control section 113 manages the proficiency level of the user.

The predetermined condition is a condition which relates to the proficiency level.

Thereby, it becomes possible to realize the replacement of the display sizes and/or the display positions of the images according to the proficiency level of the user.

The display unit 18 is further equipped with a mirror part which is installed on the front face side of the display surface thereof.

The mirror part acquires the object's mirror image as the acquisition/analysis section 112.

Thereby, also in the apparatus which performs display using a half mirror and so forth, it becomes possible to provide the user with the display which is free from the visual gap, is suitable for the user's visual recognition and has the sense of unity.

Modified Examples

The present invention is not limited to the above-described embodiment, and modifications, improvements and so forth which fall within a range that attainment of the object of the present invention is possible are included in the present invention. For example, the above-described embodiment may be modified as indicated by the following modified examples.

<Modified Example Using Half Mirror>

The display control apparatus 1 may be realized by an apparatus of a structure that the above-described display unit 18 is combined with the mirror part having a reflection surface.

In this case, the mirror part is realized by a half mirror of the type which has both transmission characteristic and reflection characteristic as optical characteristics. In addition, the mirror part is arranged on a surface which is located in front of the display unit 18 in a state of being superimposed in a direction that the user visually recognizes the display.

Owing to such arrangement, the user is able to visually recognize, for example, not the user image which is captured by the imaging unit 16 but the her/his own face which is reflected from the mirror part and various kinds of information (for example, the synthetic images) which are displayed on the display unit 18 and penetrate through the mirror part simultaneously. That is, the above-described embodiment is configured to make the user visually recognize the user image that the imaging unit 16 captures by setting the user as the subject as the user's real image. On the other hand, the present modified example is configured to make the user visually recognize the user's mirror image which is reflected from the mirror part as the user's real image.

It is possible to obtain the same effect as the above-described embodiment even when modifying the above-described embodiment in this way.

Other Modified Examples

For example, in the above-described embodiment, it is supposed that the display control apparatus 1 cooperates with each server which is included in the server group 3. Alternatively, the function of each server may be added to the display control apparatus 1 so as to execute all the processes only by the display control apparatus 1.

In addition, although in the above-described embodiment, the display control apparatus 1 to which the present invention is applied was described as electronic equipment which is incorporated into the portable and self-standing mirror by way of example, the present invention is not particularly limited thereto.

For example, the present invention is applicable to electronic equipment which is incorporated into a large-sized mirror such as a full-length mirror and so forth, electronic equipment which is incorporated into a stationary washstand and mirror-shaped electronic equipment to be installed in a bathroom.

It is also possible to make hardware and to make software execute the above-described series of processes.

In other words, the functional configuration which is illustrated in FIG. 5 is merely illustrative and there is no particular limitation to the functional configuration. That is, it is sufficient as long as a function which is able to execute the above-described series of processes as a whole is provided in the display control apparatus 1 and which functional block is used for realization of the above-described function is not particularly limited to the example in FIG. 5.

In addition, each functional block may be configured by hardware alone, may be configured by software alone and may be configured by a combination of the hardware and the software.

The functional configuration in the present embodiment is realized by a processor which executes arithmetic processing. Processors which are able to be used in the present embodiment include processors which are configured by a processing device alone in various processing devices such as a single processor, a multiprocessor, a multicore processor and so forth and, in addition, include processors each of which is configured by a combination of any one of above-described various processing devices with any one of processing circuits such as an ASIC (Application Specific Integrated Circuit), an FPGA (Field-Programmable Gate Array) and so forth.

In a case of making the software execute the series of processes, a program which configures the software is installed into a computer and so forth over a network or from a storage medium.

The computer may be a computer which is incorporated into dedicated hardware. In addition, the computer may be also a computer which is able to execute various functions by installing various programs thereinto, that is, for example, a general-purpose personal computer.

The storage medium which includes such programs is not only configured by the removable medium 100 which is distributed separately from the apparatus main body in order to provide the user with the programs and is illustrated in FIG. 4 but also configured by the storage medium and so forth which is provided to the user in a state of being incorporated into the apparatus main body in advance. The removable medium 100 is configured by, for example, the magnetic disk (including a floppy disk), the optical disk, the magnetooptical disk and so forth. The optical disk is configured by, for example, a CD-ROM (Compact Disk-Read Only Memory), a DVD (Digital Versatile Disk), a Blue-ray (a registered trademark) Disk and so forth. The magnetooptical disk is configured by an MD (Mini-Disk) and so forth. In addition, the storage medium which is provided to the user in a state of being incorporated into the apparatus main body in advance is configured by, for example, the ROM 12 in which the programs are stored and which is illustrated in FIG. 4, a hard disk which is included in the storage unit 19 in FIG. 4 and FIG. 5 and so forth.

Incidentally, in the present specification, the steps for description of the program which is stored in the storage medium naturally include processes which are executed in time series in the order of the steps and also include even processes which are executed parallelly or individually, though not necessarily executed in time series.

In addition, in the present specification, the term of the system shall mean the overall apparatus which is configured by a plurality of devices, a plurality of units and so forth.

Although several embodiments of the present invention were described as above, these embodiments are merely illustrative and do not limit the technical scope of the present invention. The present invention is able to assume other various embodiments and further various alterations such as omission, substitution and so forth are possible within a range nor deviating from the gist of the present invention. These embodiments and modifications thereof are included in the scope and the gist of the present invention which are described in the present specification and so forth and are also included in the scopes of the invention and the equivalent thereof which are described in the appended claims.

What is claimed is:

1. A display control apparatus comprising:
    a display; and
    a processor,
    wherein the processor performs processing of:
    acquiring an image,
    recognizing a predetermined object from the acquired image;
    displaying an auxiliary substitute image in which auxiliary information is added to a substitute image on the display, when the processor recognizes the predetermined object from the acquired image,
    switching between i) a first display mode in which the object's image which is acquired is displayed on the display as a first image and the auxiliary substitute image is displayed on the display as a second image and ii) a second display mode in which the object's image which is acquired is displayed on the display as the second image and the auxiliary substitute image is displayed on the display as the first image, and
    displaying the object's image and the auxiliary substitute image on the display in the switched to display mode,
    wherein:
    the processor displays the object's image and the auxiliary substitute image on the display in one of the first display mode and the second display mode based on a predetermined condition,
    the processor manages a proficiency level of a user, and
    the predetermined condition is a condition which relates to the proficiency level.

2. The display control apparatus according to claim 1, further comprising:
    an imaging device which captures an image, wherein
    the processor acquires the object's image from the imaging device.

3. The display control apparatus according to claim 1, wherein:
    the processor controls a predetermined timing that the auxiliary information is displayed on the display, and
    the processor switches between the object's image and the auxiliary substitute image to be displayed on the display while changing the auxiliary information of the auxiliary substitute image based on the predetermined timing which is controlled.

4. The display control apparatus according to claim 3, wherein:
the processor controls the predetermined timing in a case where the object in the object's image which is acquired enters a predetermined state.

5. The display control apparatus according to claim 4, wherein:
the predetermined state includes a state which relates to predetermined treatment that the object concerned performs on herself/himself.

6. The display control apparatus according to claim 4, wherein:
the predetermined state includes a state which relates to biological information of the object concerned.

7. The display control apparatus according to claim 4, wherein:
the processor selects the auxiliary substitute image in a case where the object in the image which is acquired enters the predetermined state.

8. The display control apparatus according to claim 3, wherein:
the processor performs a series of guidance by displaying the auxiliary substitute image on the display so as to switch a plurality of the auxiliary substitute image.

9. The display control apparatus according to claim 3, wherein:
the processor controls the predetermined timing based on a plurality of pieces of the auxiliary information used to perform a series of guidance.

10. The display control apparatus according to claim 1, wherein:
in the first display mode, the object's image is displayed on the display in a first display status and the auxiliary substitute image is displayed on the display in a second display status, and
in the second display mode, the object's image is displayed on the display in the second display status and the auxiliary substitute image is displayed on the display in the first display status.

11. The display control apparatus according to claim 10, wherein:
the processor displays the object's image and the auxiliary substitute image on the display in such a manner that the image which is displayed in the first display status becomes larger than the image which is displayed in the second display status.

12. The display control apparatus according to claim 10, wherein:
the processor displays the object's image and the auxiliary substitute image on the display in such a manner that a display position of the image which is displayed in the first display status and a display position of the image which is displayed in the second display status are different from each other.

13. The display control apparatus according to claim 1, wherein:
in the first display mode, the object's image is displayed on the display as a main image and the auxiliary substitute image is displayed on the display as a sub image, and
in the second display mode, the object's image is displayed on the display as the sub image and the auxiliary substitute image is displayed on the display as the main image.

14. The display control apparatus according to claim 1, further comprising:
a reflection section which is disposed on a front-face side of a display surface of the display, wherein
the processor acquires a mirror image of the object using the reflection section.

15. The display control apparatus according to claim 1, further comprising:
a memory which stores the substitute image of the object.

16. A display controlling method comprising:
acquiring an image;
recognizing, by a processor, a predetermined object from the acquired image;
displaying an auxiliary substitute image in which auxiliary information is added to a substitute image of the object on a display, when the predetermined object is recognized from the acquired image;
switching between i) a first display mode in which the object's image which is acquired is displayed on the display as a first image and the auxiliary substitute image is displayed on the display as a second image and ii) a second display mode in which the object's image which is acquired is displayed on the display as the second image and the auxiliary substitute image is displayed on the display as the first image; and
displaying the object's image and the auxiliary substitute image on the display in the switched to display mode; and
managing a proficiency level of a user,
wherein:
the switching between the first display mode and the second display mode is based on a predetermined condition; and
the predetermined condition is a condition which relates to the proficiency level of the user.

17. A non-transitory recording medium recording thereon a computer-readable display control program executable by a computer including a display and a processor, the program causing the processor to perform operations of:
acquiring an image;
recognizing a predetermined object from the acquired image;
displaying an auxiliary substitute image in which auxiliary information is added to a substitute image of the object on the display, when the predetermined object is recognized from the acquired image;
switching between i) a first display mode in which the object's image which is acquired is displayed on the display as a first image and the auxiliary substitute image is displayed on the display as a second image and ii) a second display mode in which the object's image which is acquired is displayed on the display as the second image and the auxiliary substitute image is displayed on the display as the first image; and
displaying the object's image and the auxiliary substitute image on the display in the switched to display mode; and
managing a proficiency level of a user,
wherein:
the switching between the first display mode and the second display mode is based on a predetermined condition; and
the predetermined condition is a condition which relates to the proficiency level of the user.

* * * * *